United States Patent [19]

Dohmeier

[11] 4,408,645
[45] Oct. 11, 1983

[54] LAMINATED WEARING PLATE ASSEMBLY FOR TIRE CHAIN

[76] Inventor: Hans O. Dohmeier, 24 Shipston La., Victoria, Johannesburg, South Africa

[21] Appl. No.: 381,626

[22] Filed: May 24, 1982

[30] Foreign Application Priority Data

May 22, 1981 [ZA] South Africa .................. 81/3438

[51] Int. Cl.³ .......................................... B60C 27/00
[52] U.S. Cl. ...................................... 152/172; 59/78; 152/179; 152/184; 152/223; 152/242; 152/244
[58] Field of Search ............. 152/223, 231, 232, 239, 152/240, 243, 244, 245, 171, 172, 242, 179, 182–184, 189, 191, 201; 59/78, 84

[56] References Cited

U.S. PATENT DOCUMENTS

| | | | |
|---|---|---|---|
| 2,441,656 | 5/1948 | Ansel | 152/239 |
| 2,537,835 | 1/1951 | Kendall | 152/171 X |
| 2,702,575 | 2/1955 | Fischer | 152/171 |
| 2,728,371 | 12/1955 | McCarthy | 152/239 X |
| 2,822,851 | 2/1958 | Botting | 152/244 |
| 3,490,511 | 1/1970 | Müller et al. | 152/243 |
| 3,943,990 | 3/1976 | Rieger | 152/243 |
| 4,106,542 | 8/1978 | Dohmeier | 152/243 X |

Primary Examiner—William A. Powell
Assistant Examiner—Thomas Bokan
Attorney, Agent, or Firm—Young & Thompson

[57] ABSTRACT

Tire protective or traction chain comprising a network of wearing plates 14 substantially perpendicular to the surface of a tire and connectors 12 substantially parallel to the surface of the tire interconnecting the wearing plates. Each wearing plate on the tread portion of tire comprises an assembly of multiple plates 16 that are relatively thin and that together form a wearing plate assembly of the required thickness. Alternate plates of an assembly may be of different heights or have sloping ground engaging edges arranged opposite to one another for increased traction.

6 Claims, 10 Drawing Figures

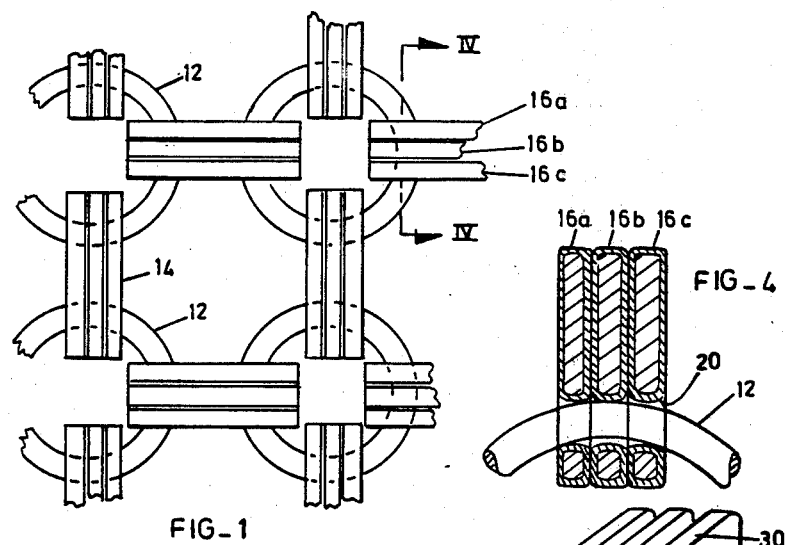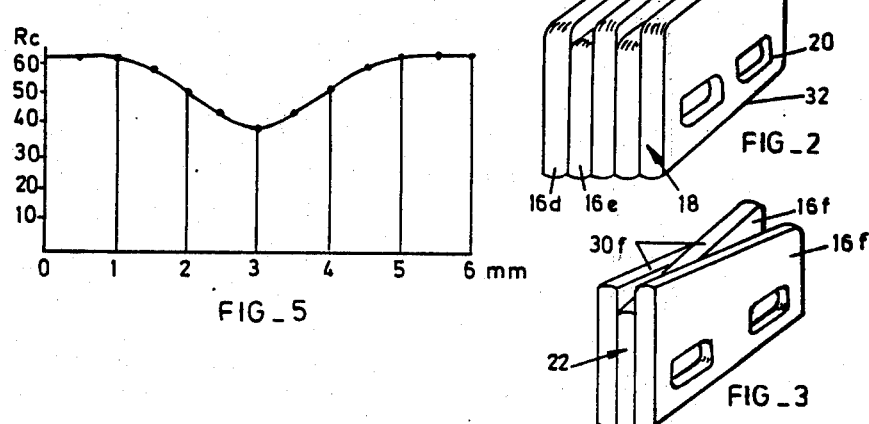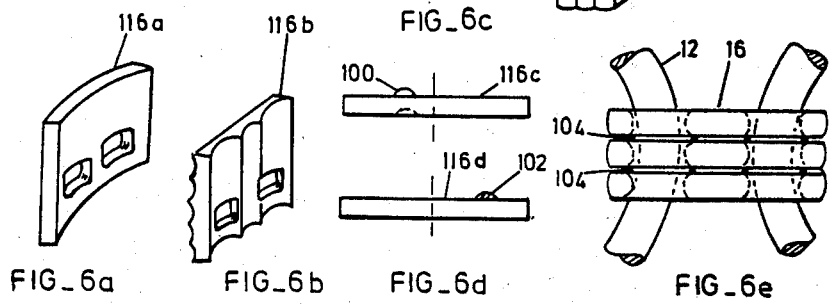

LAMINATED WEARING PLATE ASSEMBLY FOR TIRE CHAIN

FIELD OF THE INVENTION

This invention relates to a tyre protective or traction chain such as for heavy-duty earth-moving vehicles or for the wheels of vehicles where increased traction is required, such as vehicles used in lumbering.

BACKGROUND TO THE INVENTION

There are already many of such chains on the market and described in patent and other literature. This invention is concerned with chains of the type shown in my U.S. Pat. No. 4,106,542 comprising links parallel to the surface of the tyre, known as "web links" or "connectors", and links generally perpendicular to the surface, known as "wearing links" or "wearing plates". In one known type of chain the connectors are annular links or loops and the wearing plates are rectangular plates having two holes or a slot, the wearing plates being arranged in an array interconnected by the connectors. For strength and easier manufacture, two holes are preferred to a single slot. Usually three or four wearing plates are connected to each connector. The chain has a tread portion and two flanking side-wall portions for fixing the chain to a tyre and, sometimes, for providing protection.

As is to be expected the quality of the chain is mostly determined by the wearing plates which, for this reason, have been made of a variety of alloy steels with through-hardening or case-hardening (carburising) as is appropriate. These plates are normally about 12 to 16 mm thick, depending on the type and size of chain to be formed. Because of the thickness of the material used for the plates they present problems to the manufacturer in forming the plates and providing them with a suitable and consistent hardness for abrasion resistance while not being brittle and likely to break under the repeated shocks of high force to which they are subject.

SUMMARY OF THE INVENTION

According to one aspect of the invention there is provided a tyre chain comprising a network of wearing plates substantially perpendicular to the surface of a tyre in use and connectors substantially parallel to the surface of the tyre in use and interconnecting the wearing plates by being threaded through at least one opening in each wearing plate, the chain having a central tread portion and flanking sidewall portions, wherein each wearing plate of the tread portion comprises an assembly of at least two plate elements.

According to another aspect of the invention there is provided a laminated wearing plate for the tread portion of a chain of the type described above which comprises at least two plates each of a suitable steel and each suitably hardened.

Each plate may be between 2 and 14 mm thick, preferably between 4 and 12 mm thick and more preferably between 6 and 10 mm thick. Preferably there are at least three plates forming the wearing plate. The wearing plates may be used in different combinations of plates.

The steel may be mild steel or an appropriate alloy steel.

In order to facilitate hardening of the plates, a suitable formation may be provided to space the plates with respect to one another. One formation comprises a washer between the plates threaded on to one or both of the connectors on to which the plates are threaded. A second formation comprises a bend in one or more of the plates of a laminated assembly. A third formation comprises a punched projection or riffling on one or both sides of the plates. A fourth formation comprises a deposition weld deposit on a lateral side of the plates.

The total thickness of a laminated wearing plate assembly of the invention may be increased considerably over that of conventional wearing plates.

The height of successive plates in an assembly may be varied so as to form a grooved ground engaging edge. Additionally or alternatively the ground engaging edge of each plate could be sloped, with the slope of adjacent plates being in opposite directions. These constructions provide increased traction properties to the chain.

According to another aspect of the invention there is provided a tyre protection chain including wearing plates as discussed above on the tread portion thereof.

Embodiments of the invention are described below by way of example with reference to the accompanying schematic drawings.

BRIEF DESCRIPTION OF THE DRAWINGS

FIG. 1 shows a partial plan view of a portion of tyre protective chain of the invention;

FIG. 2 shows a perspective view of a wearing plate of the invention;

FIG. 3 shows a perspective view of another embodiment of wearing plate of the invention;

FIG. 4 shows an illustrative section, on an enlarged scale, along IV—IV of FIG. 1;

FIG. 5 shows a typical graph of hardness in relation to thickness of a plate of the type shown in FIG. 4; and FIGS. 6A to 6E show several embodiments of formations which may be provided for ensuring penetration of a carburising atmosphere between plates of a laminated wearing plate assembly of the invention.

DESCRIPTION OF PREFERRED EMBODIMENTS

FIG. 1 shows a portion of a tyre protective chain composed of annular connectors 12 interconnecting laminated wearing plate assemblies 14 each of which is composed of three plates 16a,b and c. In this embodiment each connector is engaged with four assemblies 14.

FIG. 2 shows one form of wearing plate assembly 18 wherein there are five plates of two types 16d and 16e. Each plate 16 is rectangular and has formed in it two oval holes 20 which are nearer one long edge 32 than the other 30. The edge 32 will contact a tyre in use and the edge 30 will engage the ground. The plates 16d are higher from edge 30 to edge 32 than the plates 16e with the result that the ground engaging edge of the assembly 18 will be grooved. This provides increased traction properties for the chain.

FIG. 3 shows a variant of wearing plate 22 composed of plates 16f, the ground engaging edge 30f of each of which is sloped as shown, the slopes being in opposite directions. This construction again is provided for increased traction.

FIG. 4 shows the chain construction of FIG. 1 in greater detail. The plates 16a and 16c straddle the plate 16b. The connector 12 passes through the holes 20 in the plates. Initially, in use, contact is made between the connector 12 and the outer edges of the plates 16a and 16c, but with wear these edges are abraded so that when the chain is retensioned, as is done conventionally, contact is made between the connector and all three plates 16. This spreads the load in the contact region so that the rate of mutual wear decreases, thus prolonging the life of the chain. As shown, each plate 16 has a case-hardened outer region with a relatively softer inner region. This is best illustrated in FIG. 5 with each plate being shown as being 6 mm thick. As can be seen, the outer hardness of each plate is between 58 and 62Rc (Rockwell C-scale) for a depth of aproximately 1.5 mm which hardness then decreases to about 35Rc in its medial region. Most of the plate, ie approximately 4 mm, has a hardness above 50Rc. The outer hardness of 58 to 62Rc to a depth of about 1.5 mm is considered by persons skilled in the art to be optimal for good abrasion resistance without being susceptible to pitting or flaking. The lower internal hardness provides each plate with high strength against shocks and large loads. The three plates 16 provide a total thickness of 9 mm that is above 58Rc. Thus the wear resistant portion is no longer limited to the ground engaging edge only of the wearing plate, but also extends to a slightly less degree throughout the wearing plate assembly, ie 50% of the width of the assembly has a hardness above 58Rc.

The plates 16 may be of any suitable thickness between 2 and 14 mm, the thickness being chosen to allow for hardening and heat treating of the chain after assembly of wearing plates and connectors to achieve a suitable case-hardening depth for the plates and connectors consistent with a relatively softer inner portion to provide the required flexibility to avoid fracture. With mild steel and most suitable alloy steels these thicknesses permit the plate to be worked cold, eg holes punched, without using very heavy presses and without placing the punching dies under undue strain. Other considerations in selecting the thickness of the plates 16 are the cost of and depth of case-hardening and the number of plates to be used. This selection is a matter of design easily solved by persons skilled in the art, with plates between 6 and 10 mm thick satisfying almost all requirements.

Presently marketed chains have wearing plates with thicknesses of 10, 12, 14, and 16 mm. Sometimes the wearing plate thicknesses vary across the tread of the tyre, with others it is uniform, depending on the intended application and cost. This requires the manufacturer at present to make and store plates of different thicknesses. With the embodiments described above however, a standard plate 16 can be made and then these used to form laminated assemblies as desired. For example, instead of using a single 16 mm thick plate, three to six 5 or 6 mm plates 16 can be used providing a lateral hardened thickness of 9 to 18 mm persisting throughout the height of the wearing plate.

When mild steel is used the hardening of the wearing plate assembly also requires carburising in a gaseous or liquid atmosphere. To ensure penetration of such an atmosphere between the plates, one or more of the constructions shown in FIG. 6 may be used. In FIG. 6A a plate 116a is bent about its minor axis. The plate may also be bent about a major axis or a diagonal, though the construction shown provides higher loading stiffness to the plate. FIG. 6B shows that the sides of a plate 116b are riffled with the principal axis of the flutes on opposite sides of the plates being perpendicular. The axes may also be parallel or riffling may be on one side only. The riffling may be formed during extrusion or rolling of a strip from which the plate is cut or it may be formed by pressing. In FIG. 6C a dent 100 is pressed into a plate 116c. The dent may be central or offset from the centre as shown. In FIG. 6D a spot of material 102 is deposited on a plate 116d. In FIG. 6e washers or rings of wire 104 are threaded on to the connectors 12 between adjacent plates. When hardened the washers become brittle because they are so thin, so that in use they quickly break and fall off and have no further effect on the chain.

An advantage of the embodiments described above is that the hardness of the wearing plate assemblies is high for a considerable portion of the thickness of the assembly and persists throughout the height of the assembly. For example for an assembly composed of three mild steel plates each 6 mm thick has a total laterally hardened portion of about 9 mm above 58Rc compared with 3 mm for a conventional wearing plate. In the former event the hardened portion is 50% of the thickness while it is 19% for a comparable 16 mm conventional wearing plate. Of course, the conventional wearing plate could be made of an alloy steel which is hardened primarily by temperature control to obtain a hardened portion of 50% that is above 58Rc: however, in this event there will also be a consequent hardening throughout the plate though not necessarily to the same extent and such hardness may cause the plate to be brittle and subject to fracture under shock loading.

While the wearing plate assembly of the invention could be formed of alloy steel plates, an advantage of the invention is that mild steel can also be used, such mild steels being easily available and of slightly lower cost than alloy steels.

A further advantage of the embodiments described above is that the thickness of the laminated assembly may be increased considerably over that possible with conventional wearing plates to provide increased traction and protection for the tyre. This follows from the geometry of the situation wherein the diameter of the connectors and dimensions of the holes 20 determine the maximum thickness of wearing plate that can be threaded on to a connector. With the assembly of the invention, however, the individual plates 16, because they are relatively thin, can easily be threaded on to the connectors to form a wearing plate of any desired thickness.

The invention is not limited to the precise constructions shown in the drawings and described above and many modifications can be made as will other embodiments become apparent without departing from the spirit of the invention and still being within the scope of the appended claims. For example the plates can be formed by casting instead of being fabricated. Also the assemblies can be formed of plates of different steels so that after hardening some will have greater flexibility while others will have greater abrasion resistence. Repair wearing plates, as known in the art, may also be made of a laminated construction.

I claim:

1. A tire protective chain to be applied to a rubber tire of an earth-moving machine and the like, comprising a closed, substantially uniform network of stiff metal wearing plates that will be substantially perpendicular to the surface of a tire in use and stiff metal connectors that are in the form of closed loops that will be substantially parallel to the surface of the tire in use and that interconnect the wearing plates by being threaded through at least one opening in each wearing plate, each wearing plate being connected to two connectors that are themselves connected to wearing plates only and each connector being connected to at least three wearing plates, the chain having a central tread portion and flanking sidewall portions, each wearing plate of the tread portion comprising a laminated assembly of at least two plate elements each of which is substantially rectangular and has at least one opening through which a connector is threaded, the opening being closer to one long edge than the other, each plate element having a thickness of between 6 and 10 mm and a hardness adjacent the surface of excess of 50 Rockwell C-scale for at least 40% of the thickness of the plate with the remaining core portion having a hardness below 50 Rockwell C-scale.

2. A tyre chain as claimed in claim 1, in which each plate element is composed of mild steel which is case-hardened.

3. A tyre chain as claimed in claim 1, in which at least some of the plate elements have a formation to space them apart from adjacent plate elements.

4. A tyre chain as claimed in claim 1, in which some of the plate elements of at least some of the wearing plate assemblies are of different heights from other plate elements of the assembly.

5. A tyre chain as claimed in claim 1, in which at least some of the plate elements have a sloping ground engaging edge.

6. A tyre chain as claimed in claim 5, in which at least some of the wearing plate assemblies are composed of plate elements having a sloping ground engaging edge, the slopes of adjacent plate elements in an assembly being opposite.

* * * * *